United States Patent
Milton

[15] 3,670,591
[45] June 20, 1972

[54] COLLAPSIBLE STEERING SHAFT ASSEMBLY

[72] Inventor: Thomas J. Milton, Bay City, Mich.
[73] Assignee: General Motors Corporation, Detroit, Mich.
[22] Filed: Feb. 5, 1971
[21] Appl. No.: 112,910

[52] U.S. Cl. ............................................................74/492
[51] Int. Cl. ..........................................................B62d 1/18
[58] Field of Search ..........................................74/492, 493

[56] References Cited

UNITED STATES PATENTS 3,538,783  11/1970  Butts.........................................74/492

Primary Examiner—Milton Kaufman
Attorney—W. E. Finken and R. L. Phillips

[57] ABSTRACT

A collapsible steering shaft assembly for a collapsible steering column assembly is disclosed as comprising a sleeve member and a shaft member projecting from within the sleeve member which are rotatably mounted within a collapsible steering column. A joining member for joining the sleeve and shaft members is located intermediate thereof and is fixed against both axial and angular movement relative to one of the members. The joining member and the other of the steering shaft members have a first detent which normally prevents inward collapse of the steering shaft assembly and a second detent which normally prevents outward telescoping of the steering shaft assembly. The first detent of the joining member is shearable and the second detent of the joining member is yieldable to permit inward collapse of the steering shaft assembly upon an end impact of the steering column assembly of a predetermined magnitude. The joining member and the other of the steering shaft members also have a third detent which normally prevents relative angular movement between the sleeve and shaft members. Further, the sleeve and shaft members have structures providing a joint therebetween that operates during and after the inward collapse of the steering shaft assembly to maintain the locked angular relationship therebetween. that operates 4 Claims, 7 Drawing Figures

PATENTED JUN 20 1972 3,670,591

INVENTOR.
Thomas J. Milton
BY
Ronald L. Phillips
ATTORNEY

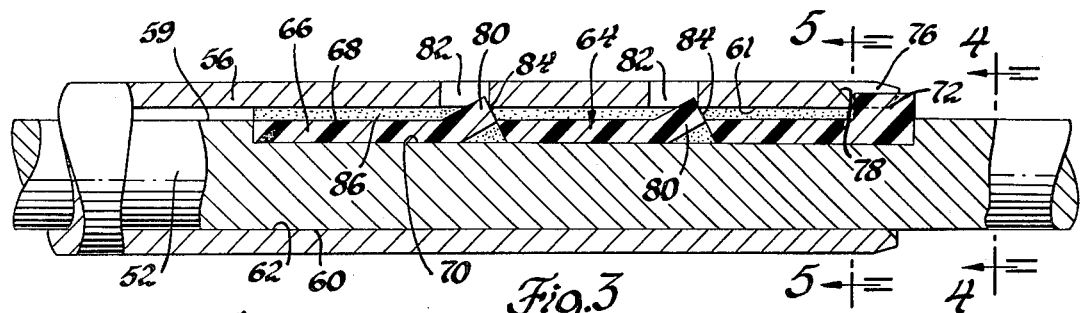
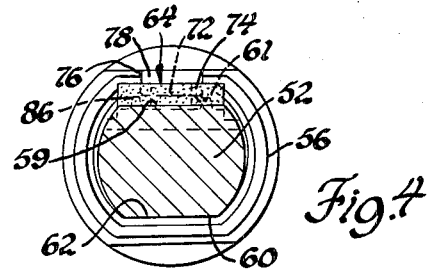
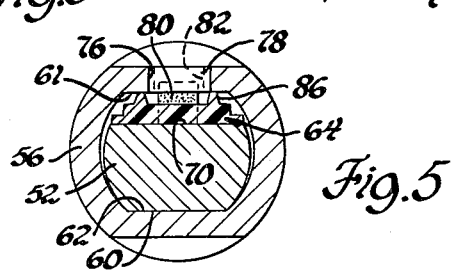
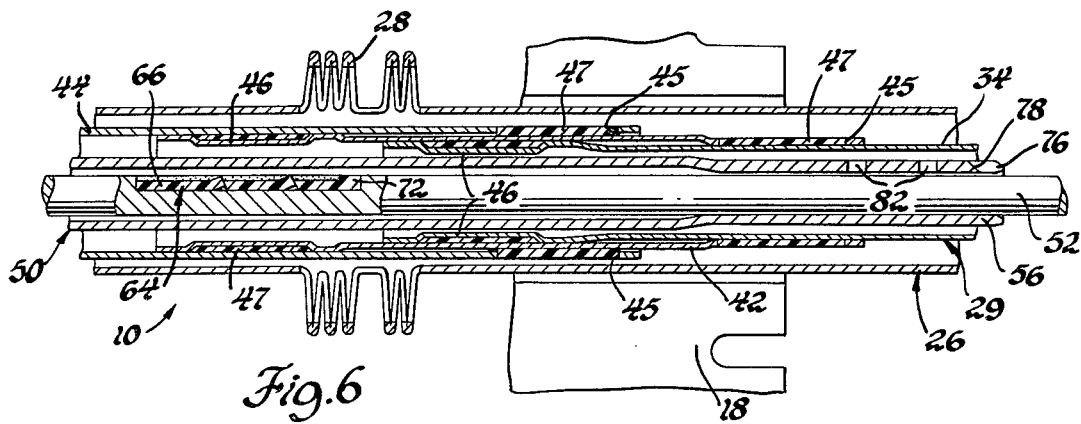
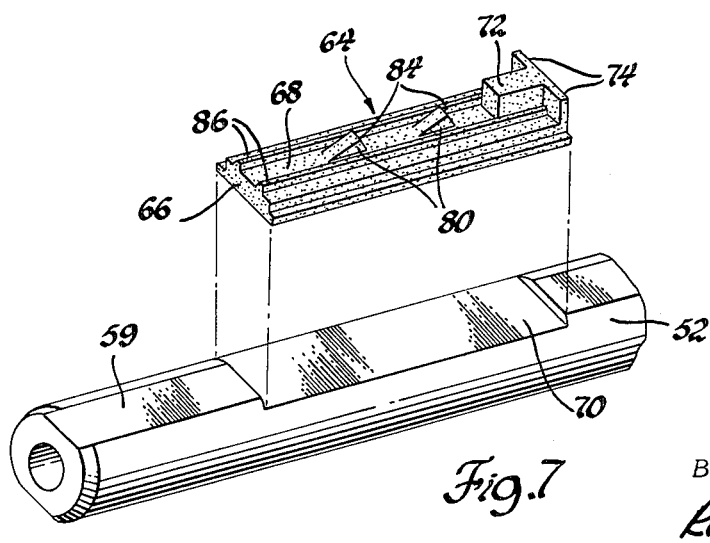
INVENTOR.
Thomas J. Milton
BY
Ronald L. Phillips
ATTORNEY

COLLAPSIBLE STEERING SHAFT ASSEMBLY

The present invention relates to steering shaft assemblies and more particularly to steering shaft assemblies which collapse upon an end impact of the steering column assembly.

In present collapsible steering shaft assemblies, it is common practice to have sleeve and shaft members which are normally joined by shear keys that are molded in situ and are sheared to permit the inward collapse of the steering shaft assembly with the other components of the steering column assembly. Further, the outward telescoping of the steering shaft assembly is prevented in such steering shaft assemblies by joint structure other than the shear keys. After an inward collapse, either the sheared keys or the steering shaft assembly is replaced.

The steering shaft assembly, according to the present invention, includes a sleeve member and a shaft member, which projects from within the sleeve member, rotatably mounted within the collapsible steering column of the steering column assembly. A joining member is located intermediate the sleeve and shaft members in a flat recess in the shaft member to prevent axial and angular movement of the joining member relative to the shaft member. The joining member has end projections which cooperate with a slot in the sleeve member and the end portion of the sleeve member to normally prevent inward collapse of the steering shaft assembly. The end projections are shearable upon an end impact of the steering column assembly of a predetermined magnitude, thereby permitting inward collapse of the steering shaft assembly. The joining member also has flexible tab members which cooperate with radial holes in the sleeve member to normally prevent outward telescoping of the steering shaft assembly and which deflect upon the shearing of the end projections to permit the inward collapse of the steering shaft assembly. The joining member further includes axially extending ribs which cooperate with a flat surface on the inner periphery of the sleeve member to normally prevent relative angular movement between the members. The relative angular relationship between the sleeve and shaft members is maintained after the inward collapse of the steering shaft assembly by the cooperation of a pair of parallel flat surfaces on the shaft member with a pair of flat surfaces on the inner periphery of the sleeve member. Also, the steering shaft assembly can be repositioned and maintained in its normally operable position after inward collapse because the flexible tabs of the joining member relocate within the radial holes of the sleeve member upon outward telescoping of the steering shaft assembly.

An object of the present invention is to provide a new and improved collapsible steering shaft assembly.

Another object is to provide a collapsible steering shaft assembly comprising a sleeve member and shaft member with a joining member therebetween which is fixed in the steering shaft member to normally prevent inward collapse, outward telescoping, and relative angular movement between the members of the steering shaft assembly.

Still another object is to provide a collapsible steering shaft assembly which, after inward collapse, can be repositioned and maintained in its normally operable position by a joining member.

These and other objects of the invention will become more fully apparent from the following description and drawings wherein:

FIG. 3 is an enlarged view of the juncture of the steering shaft assembly members shown in FIG. 2;

FIG. 4 is a view taken along 4—4 in FIG. 3;

FIG. 5 is a view taken along line 5—5 in FIG. 3;

FIG. 6 is a view similar to FIG. 2 but showing a collapsed condition;

FIG. 7 is a perspective view showing the assembly of the joining member to the steering shaft member.

Figure 1:
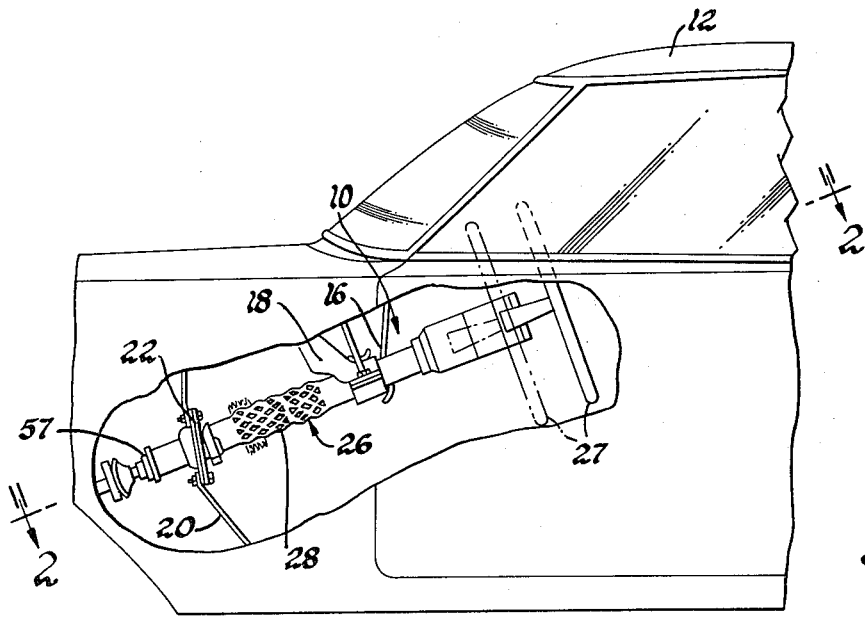
FIG. 1 is a side elevation of a vehicle with a cutaway section showing a steering column assembly in which is incorporated the collapsible steering shaft assembly of the present invention.

Referring to FIG. 1, a collapsible steering column assembly 10 which includes the collapsible steering shaft assembly of the present invention is shown in a vehicle 12. The steering column assembly 10 is mounted below an instrument panel 16 on a support 18 and extends through a fire wall 20 where it is mounted in a bracket assembly 22.

Figure 2:
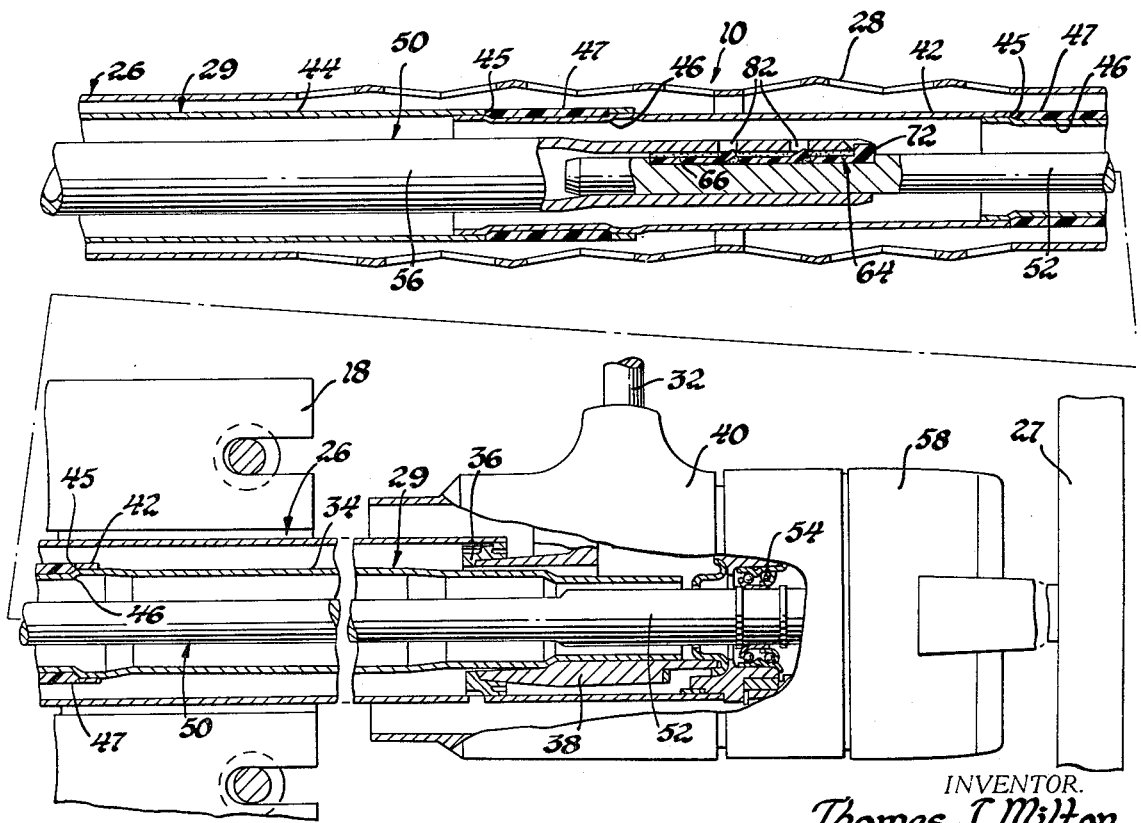
FIG. 2 is an enlarged view with parts in section taken along line 2—2 in FIG. 1.

Referring to FIG. 2, the steering column assembly 10 includes a collapsible steering column 26 which extends from near the end of the steering column assembly 10, which supports the steering wheel 27, through support 18 to the fire wall 20. The steering column 26 serves as a support to which the other components of the steering column assembly 10, which will later be described, are mounted. It further serves to absorb an end impact causing collapse of the steering column assembly 10. Accordingly, it is provided intermediate the fire wall 20 and support 18 with an energy absorbing mesh 28 which is constructed of a network of intersecting and interconnected strips which yield and undergo a certain degree of plastic deformation operative to absorb the impact while collapsing.

The outer column 26 has mounted therein a collapsible shift tube assembly 29 which serves to transfer the movement of a transmission shift lever 32 to the transmission, not shown, of the vehicle 12, thereby providing for the shifting of the transmission. The shift tube assembly 29 includes an upper section 34 which is mounted within a shift tube support block 36 located adjacent the upper end of the steering column 26 and which has its upper end press-fitted within an inner hub 38 of a shift barrel 40 which mounts the transmission shift lever 32. The shift tube assembly 29 further includes an intermediate section 42 and a lower section 44 which has its lower end mounted in an adapter, not shown, and operatively connected by linkage, not shown, to the vehicle's transmission. The lower end of upper section 34 is received within the upper end of intermediate section 42, which in turn has its lower end received within lower section 44. The upper ends of sections 42 and 44 are each provided with a pair of axially extending slots 45 while the lower ends of sections 34 and 42 are provided with pairs of lanced depressions 46 aligned with slots 45 to provide cavities for shear keys 47 which are molded in situ to join shift tube sections 34, 42, and 44 while providing for the collapse of the shift tube assembly 29 which will later be described.

The steering column assembly 10 includes a steering shaft assembly 50 which has its upper end supporting steering wheel 27 and its lower end received within the housing of the steering gear, not shown, thereby transferring the movement of the steering wheel 27 to the steering gear for steering vehicle 12. The steering shaft assembly 50 comprises a shaft member 52 which is supported near its upper end by a bearing 54 fixedly mounted to steering column 26 and a sleeve member 56 which has its lower end rotatably supported in an adapter 57, shown in FIG. 1, near the steering gear. The shaft member 52 has a spline or other suitable connection at its upper end to a hub 58 for affixing the steering wheel 27.

Referring to FIGS. 2 and 4, shaft member 52 has its lower end portion received within the upper end portion of sleeve member 56. The shaft member 52 has parallel flat surfaces 59 and 60 which extend from the end received within sleeve member 56 for substantially its entire length to a position adjacent its upper end and cooperate with a pair of parallel flat surfaces 61 and 62 on the inner periphery of sleeve member 56 which extend for a relatively short distance from the end of the member which receives shaft member 52. The cooperation between flat surfaces 59 and 60 and flat surfaces 61 and 62 provides a joint between the shaft member 52 and sleeve member 56 which prevents relative angular movement. The structure thus far described is conventional and of the type disclosed in Wight et al U.S. Pat. No. 3,373,629.

There is, according to the present invention, joint means for normally joining the steering shaft members 52 and 56 to normally prevent relative axial and angular movement therebetween comprising a joining member 64 of material having such elastic and shear characteristics, such as a plastic, as to provide for the deflection and shearing of the joining member 64 which will later be described.

Referring to FIGS. 3 and 7, the joining member 64 has a rectangular shaped base 66 with a face side 68. The joining member 64 is located intermediate the shaft member 52 and the sleeve member 56 and has its base 66 received within a flat bottomed recess 70 in surface 59 adjacent the lower end of shaft member 52. The joining member 64 further includes an end projection 72 which projects perpendicularly from the face side 68 and extends a short distance along the face side 68 from the end of the joining member 64 farthest from the lower end of the shaft member 52. The joining member 64 also includes a pair of side end projections 74 which project perpendicularly from the face side 68, are immediately adjacent and joined to the end projection 72, and extend along the face side 68 from the end of the joining member 64 farthest from the lower end of shaft member 52 a relatively much shorter distance than end projection 72. The end projection 72 is located within a slot 76 in sleeve member 56 which extends axially from the upper end of sleeve member 56 through flat surface 61 and terminates in inclined surface 78, thereby cooperating with inclined surface 78 to serve as a part of a first detent to normally prevent inward collapse of the steering shaft assembly 50. The side end projections 74 cooperate with the upper end of sleeve member 56 to also serve as a part of the first detent by preventing inward collapse of the steering shaft assembly 50. The joining member 64 further includes a pair of flexible tabs 80 which project angularly from the face side 68 and are axially aligned. The flexible tabs 80 are located within a pair of holes 82 through flat surface 61 of sleeve member 56 which are axially aligned with slot 76 and which cooperate with the ends 84 of flexible tabs 80 to serve as a second detent to prevent outward telescoping of the steering shaft assembly 50. The joining member 64 further includes a pair of ribs 86 which extend axially in a parallel fashion from side end projections 74 to the other end of the joining member 64 and which cooperate with flat surface 61 of the sleeve member 56 to provide clearance takeup between the shaft and sleeve members 52 and 56 and to force contact between flat surfaces 60 and 62, thereby serving as a third detent to join the shaft member 52 and sleeve member 56 for conjoint rotation as shown in FIGS. 4 and 5.

Upon an end impact of the steering column assembly 10 of a predetermined magnitude, the shift tube assembly 29 and steering shaft assembly 50 collapse form their normal operable position shown in FIG. 2 to the position shown in FIG. 6 to permit the collapse of steering column 26 which absorbs the impact by buckling at mesh 28 as was previously described. The impact causes relative axial movement between the upper section 34, intermediate section 42, and upper section 44 of the shift tube assembly 29 which shears the keys 47 and permits the inward collapse. The end impact of the steering column assembly 10 also causes axial movement between shaft member 52 and sleeve member 56. Because of the relationship of the joining member 64 to the shaft member 52 and sleeve member 56, the joining member 64 is in a fixed relationship both axially and angularly to shaft member 52. The end impact of the steering column assembly 10, therefore, breaks the relationship between the joining member 64 and the sleeve member 56. The end projection 72 and the side end projections 74 are sheared from the joining member 64 by inclined surface 78 and the end portion of sleeve member 56 respectively, thereby permitting the inward collapse of the steering shaft assembly 50. The flexible tabs 80 are deflected radially inward toward the joining member 64 by the sides of holes 82 upon the shearing of end projection 72 and side end projections 74, thereby also permitting inward collapse of the steering shaft assembly 50. Because of the relatively short length of flat surfaces 61 and 62 on the inner periphery of sleeve member 56, the inward collapse of the steering shaft assembly 50 results in the disassociation of ribs 86 from flat surface 61. The locked angular relationship of the shaft member 52 and sleeve member 56, however, is now maintained by the joint resulting from the cooperation of flat surfaces 59 and 60 with flat surfaces 61 and 62.

The steering column assembly 10 can be repositioned and maintained in its normally operable position shown in FIG. 2 after inward collapse from an impact on the upper end of the assembly by telescoping the assembly outward. The outward telescoping of the assembly 10 results in the repositioning of the flexible tabs 80 within holes 82 of sleeve member 56 because of the elastic characteristics of the joining member 64. The repositioning of the flexible tabs 80 within holes 82 then provides a sufficient restriction to relative axial movement to maintain the steering column assembly 10 in its normally operable position.

The foregoing disclosure relates to only one embodiment of the invention which may be modified within the scope of the appended claims.

What is claimed is:

1. In a collapsible steering column assembly, the combination comprising a collapsible steering column, a collapsible steering shaft assembly including a sleeve member and a shaft member projecting from within said sleeve member, said sleeve and shaft members being rotatably mounted within said steering column, joining means intermediate said sleeve and shaft members and fixed against both axial and angular movement relative to one of said members, said joining means and the other of said members having cooperating first detent means for normally preventing inward collapse of said steering shaft assembly, said first detent means of said joining means being shearable to permit inward collapse of said steering shaft assembly upon an end impact of said steering column assembly of a predetermined magnitude, said joining means and said other member having cooperating second detent means for normally preventing outward telescoping of said steering shaft assembly, said second detent means of said joining means being yieldable upon said shearing of said first detent means of said joining means to permit inward collapse of said steering shaft assembly, said joining means and said other member having cooperating third detent means for normally preventing relative angular movement between said members, and said sleeve and shaft members having cooperating joint means for preventing relative angular movement therebetween during and after inward collapse of said steering shaft assembly.

2. In a collapsible steering column assembly, the combination comprising a collapsible steering column, a collapsible steering shaft assembly including a sleeve member and a shaft member projecting from within said sleeve member, said sleeve and shaft members being rotatably mounted within said steering column, joining means intermediate said sleeve and shaft members and fixed against both axial and angular movement relative to one of said members, said joining means and the other of said members having cooperating first detent means for normally preventing inward collapse of said steering shaft assembly, said first detent means of said joining means being shearable to permit inward collapse of said steering shaft assembly upon an end impact of said steering column assembly of a predetermined magnitude, said joining means and said other member having cooperating second detent means for normally preventing outward telescoping of said steering shaft assembly, said second detent means of said joining means being yieldable upon said shearing of said first detent means of said joining means to permit inward collapse of said steering shaft assembly, said second detent means of said joining means being further operable to return after yielding to again cooperate with said second detent means of said other member upon repositioning of said sleeve and shaft members after inward collapse of said steering shaft assembly to prevent both inward collapse and outward telescoping of said steering shaft assembly, said joining means and said other member having cooperating third detent means for normally preventing relative angular movement between said members, and said sleeve and shaft members having cooperating joint means for preventing relative angular movement therebetween during and after inward collapse of said steering shaft assembly.

3. In a collapsible steering column assembly, the combination comprising a collapsible steering column, a collapsible steering shaft assembly including a sleeve member and a shaft member projecting from within said sleeve member, said sleeve member having a pair of parallel flat surfaces on its inner periphery, said shaft member having a pair of parallel flat surfaces, said sleeve and shaft members being rotatably mounted within said steering column, one of said members having a slot extending axially from one end and also having radial holes adjacent said one end through one of said flat surfaces, joining means intermediate said sleeve and shaft members and located in a recess of the other of said members to prevent axial and angular movement of said joining means relative to said one member, said joining means having end projection means for cooperating with said slot to normally prevent inward telescoping of said steering shaft assembly, said end projection means being shearable from said joining means to permit inward collapse of said steering shaft assembly upon an end impact of said steering column assembly of a predetermined magnitude, said joining means having flexible tab means for cooperating with said radial holes to normally prevent outward telescoping of said steering shaft assembly, said flexible tab means being deflectable upon said shearing of said end projection means of said joining means to permit inward collapse of said steering shaft assembly, said joining means having rib means for cooperating with one of said flat surfaces to normally prevent relative angular movement between said members, and said flat surfaces of said shaft member cooperating with said flat surfaces of said sleeve member to prevent relative angular movement between said members during and after inward collapse of said steering shaft assembly.

4. In a collapsible steering column assembly, the combination comprising a collapsible steering column, a collapsible steering shaft assembly including a sleeve member rotatably mounted within said steering column, said sleeve member having a pair of parallel flat surfaces on its inner periphery, said sleeve member having a pair of axially spaced holes extending radially through one of said flat surfaces, said sleeve member also having a slot axially aligned with said holes which extends from one end of said sleeve member and terminates in an inclined surface, said steering shaft assembly including a shaft member projecting from within the slotted end of said sleeve member and rotatably mounted within said steering column, said shaft member having a pair of parallel flat surfaces for cooperating with said flat surfaces of said sleeve member to prevent relative angular movement between said members during and after collapse of said steering shaft assembly, one of said flat surfaces of said shaft member having a flat bottomed recess therein, a joining member intermediate said sleeve and shaft members and located within said flat bottomed recess through one of said flat surfaces to prevent axial and angular movement relative to said shaft member, said joining member having an end projection for cooperating with said inclined surface of said slot to normally prevent inward collapse of said steering shaft assembly and shearable from said joining member by said inclined surface to permit inward collapse of said steering shaft assembly upon an end impact of said steering column assembly of a predetermined magnitude, said joining member also having side end projections adjacent and joined to said end projection for cooperating with said slotted end of said sleeve member to normally prevent inward collapse of said steering shaft assembly and shearable from said joining member by said slotted end of said sleeve member upon said end impact to permit inward collapse of said steering shaft assembly, said joining member also having a pair of axially aligned deflectable tabs for cooperating with the sides of said axially spaced holes for normally preventing outward telescoping of said steering shaft assembly and deflectable radially inward toward said joining member by said sides of said axially spaced holes upon said shearing of said end and side end projections of said joining member to permit inward collapse of said steering shaft assembly, said joining member also having a pair of axially extending ribs for cooperating with said one flat surface of said sleeve member for normally preventing relative angular movement between said members and to force contact between the other of said flat surfaces of said sleeve and shaft members to normally prevent relative angular movement between said members.

* * * * *